United States Patent
Swann (10) Patent No.: US 9,404,556 B2
(45) Date of Patent: Aug. 2, 2016

(54) DAMPER

(71) Applicant: Waukesha Bearings Corporation, Pewaukee, WI (US)

(72) Inventor: Michael K. Swann, Gales Ferry, CT (US)

(*) Notice: Subject to any disclaimer, the term of this patent is extended or adjusted under 35 U.S.C. 154(b) by 323 days.

(21) Appl. No.: 14/207,380

(22) Filed: Mar. 12, 2014

(65) Prior Publication Data

US 2014/0265730 A1   Sep. 18, 2014

Related U.S. Application Data (60) Provisional application No. 61/778,374, filed on Mar. 12, 2013.

(51) Int. Cl.
| | |
|---|---|
| H01L 41/08 | (2006.01) |
| F16F 7/10 | (2006.01) |
| F16F 15/18 | (2006.01) |

(52) U.S. Cl.
CPC ...................... *F16F 15/18* (2013.01)

(58) Field of Classification Search
CPC .... B60G 2400/252; F16L 3/202; G03F 7/709
USPC ............... 310/311–371; 267/140, 13, 140.15; 188/378, 379
See application file for complete search history.

(56) References Cited

U.S. PATENT DOCUMENTS

| | | | |
|---|---|---|---|
| 4,012,083 A | 3/1977 | Habermann et al. | |
| 5,111,102 A | 5/1992 | Meeks | |
| 5,355,040 A | 10/1994 | New | |
| 6,373,156 B2 | 4/2002 | Suzuki et al. | |
| 6,770,993 B1 | 8/2004 | Heshmat et al. | |

(Continued)

FOREIGN PATENT DOCUMENTS

| | | |
|---|---|---|
| CN | 102434586 A | 5/2012 |
| EP | 0590179 A | 4/1994 |

(Continued)

OTHER PUBLICATIONS

International Search Report and Written Opinion for PCT/US2013/069261, dated Feb. 15, 2014.

(Continued)

*Primary Examiner* — Thomas Dougherty (74) *Attorney, Agent, or Firm* — Hamilton IP Law, PC; Jay R. Hamilton; Charles A. Damschen (57) ABSTRACT

An illustrative embodiment of a damper for use with rotary machinery may include a damper mass connected to an electronics housing via one or more piezo elements. The illustrative embodiment of the damper may include one or more electrical components wherein the electrical components, piezo elements, and/or damper mass may be tuned such that the damper is configured with an electrical resonance frequency corresponding to a mechanical resonance frequency present in a component of the rotary machinery. The piezo elements may be extension/retraction type or bending type, and they may have any orientation with respect to the rotational axis of the rotary machinery depending on the specific embodiment and/or application of the damper.

19 Claims, 9 Drawing Sheets

(56) References Cited

U.S. PATENT DOCUMENTS

| | | | |
|---|---|---|---|
| 6,777,841 B2 | 8/2004 | Steinmeyer | |
| 7,611,286 B2 | 11/2009 | Swann et al. | |
| 7,648,279 B2 | 1/2010 | Struziak et al. | |
| 7,908,885 B2 | 3/2011 | Devitt | |
| 8,517,665 B2 | 8/2013 | Lugo et al. | |
| 8,531,071 B2 | 9/2013 | Klusman | |
| 2004/0264819 A1 | 12/2004 | Weingord et al. | |
| 2007/0068756 A1* | 3/2007 | Huston | F16F 15/02 188/378 |
| 2008/0203838 A1 | 8/2008 | Komori et al. | |
| 2008/0210773 A1* | 9/2008 | Malek | F02M 45/10 239/102.2 |
| 2009/0236113 A1* | 9/2009 | Gumpert | B25D 17/24 173/210 |
| 2010/0101906 A1* | 4/2010 | Herold | F16F 7/1011 188/379 |
| 2010/0247010 A1 | 9/2010 | Lee et al. | |
| 2012/0098358 A1 | 4/2012 | Prieto | |
| 2013/0188895 A1 | 7/2013 | Devitt | |

FOREIGN PATENT DOCUMENTS

| | | |
|---|---|---|
| EP | 0875685 A | 11/1998 |
| JP | 11264415 A | 9/1999 |
| KR | 1020090008672 A | 1/2009 |

OTHER PUBLICATIONS

Search Report and Written Opinion, dated Jul. 4, 2014 for PCT/US2014/025093.

\* cited by examiner

DAMPER

CROSS REFERENCE TO RELATED APPLICATIONS

The present application claims priority from provisional U.S. Pat. App. No. 61/778,374 filed on Mar. 12, 2013, which is incorporated by reference herein in its entirety.

FIELD OF INVENTION

The present invention relates to dampers, and more specifically, to mass dampers for bearings.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Many types of magnetic bearings and active magnetic bearings exist. An active magnetic bearing (AMB) works on the principle of electromagnetic attraction and/or repulsion and may consist of an electromagnet assembly, a set of power amplifiers that supply current to the electromagnets, a controller, and gap sensors with associated electronics to provide the feedback required to control the position of the rotor within the gap. AMBs may be radial or axial in orientation. Both types of magnetic bearings may experience vibrations, which vibrations may be a result of rotor resonance.

EP 2187075 provides one example of a magnetic bearing, and EP 1504201 discloses a dynamically stabilizing magnetic bearing, both of which patents are incorporated by reference herein in their entireties.

U.S. Pat. Nos. 4,935,838 and 6,099,165 disclose various vibration controllers for rotary machinery, both of which patents are incorporated by reference herein in their entireties.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

| DETAILED DESCRIPTION - LISTING OF ELEMENTS | |
| --- | --- |
| ELEMENT DESCRIPTION | ELEMENT # |
| Bearing | 8 |
| Damper | 10 |
| Shaft | 12 |
| Rotational axis | 14 |
| Notch | 16 |
| Bearing rotor | 20 |
| Rotor cavity | 22 |
| Damper mass | 30 |
| Surface feature | 30a |
| Chamfer | 30b |
| Slot | 30c |
| Piezo element | 32 |
| Connector | 32a |
| Piezo element assembly | 33 |
| Spacer ring | 34 |
| Electronics housing | 36 |
| End ring | 38 |
| Angled extension | 38a |
| Outer radial limiter | 38b |
| Inner radial limiter | 38c |
| Mass guide | 40 |
| Channel | 42 |
| Upper angled surface | 42a |
| Lower angled surface | 42b |
| Lip | 43 |
| Upper limit | 44a |
| Lower limit | 44b |
| Axial interface | 45 |
| Sleeve | 50 |
| Axial channel | 52 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
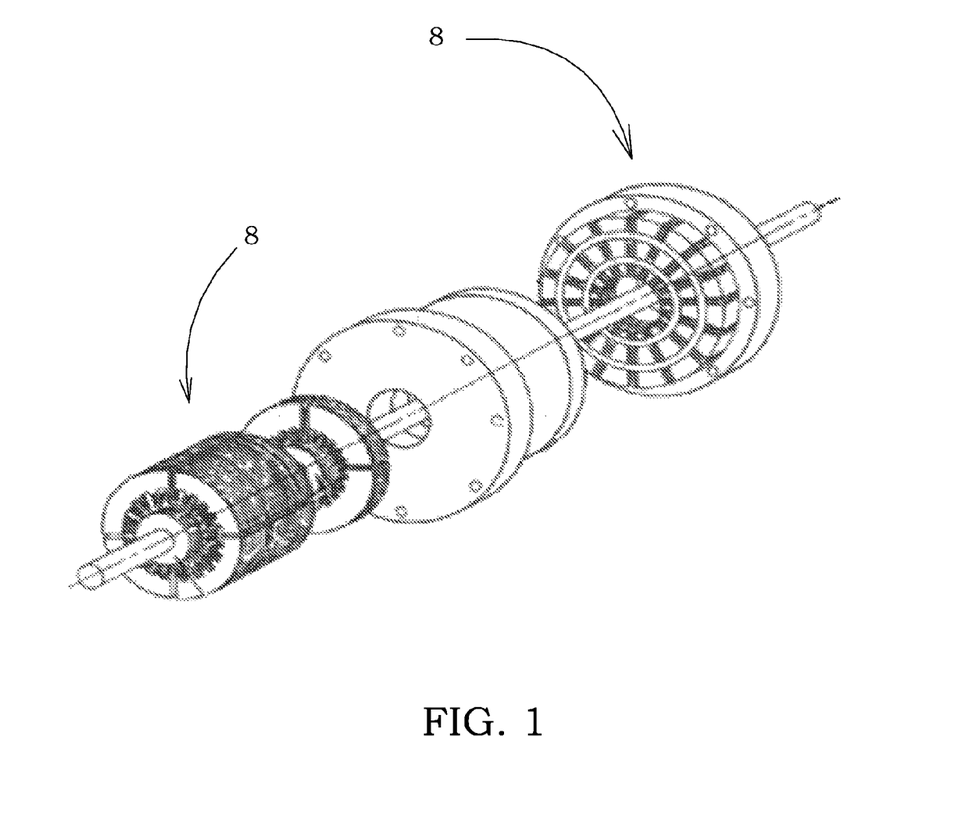
FIG. 1 provides a perspective view of an axial and a radial magnetic bearing as found in the prior art.

Referring now to the drawings, wherein like reference numerals designate identical or corresponding parts throughout the several views, FIG. 1 provides a perspective view of both a radial and an axial AMB 8 as found in the prior art. Generally, AMBs may be used on various rotary machines, wherein a portion of the AMB is engaged with the machine rotor such that it rotates therewith and a portion of the AMB is engaged with the machine housing such that it is stationary. Such AMBs are well known to those skilled in the art and will therefore not be described herein in further detail.

Figure 2:
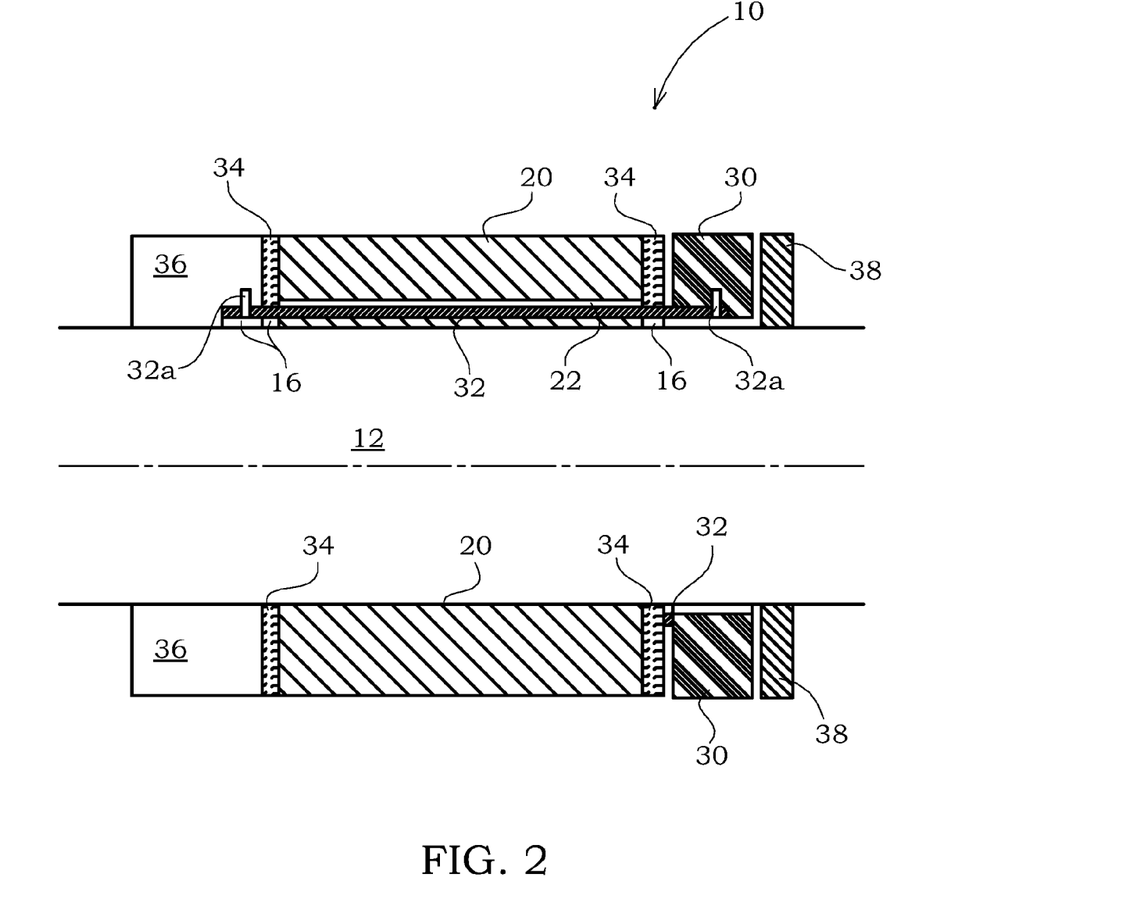
FIG. 2 provides an axial, cross-section view of a first illustrative embodiment of a damper.

An axial, cross-sectional view of a first illustrative embodiment of a damper 10 according to the present disclosure is shown in FIG. 2. The first illustrative embodiment of a damper 10 may generally include a damper mass 30, an electronics housing 36, a spacer ring on either side of a bearing rotor 20 (all of which may be generally ring-shaped), and one or more piezo elements 32 engaged with the both the electronics housing 36 (or a sleeve 50) and damper mass 30. The piezo elements 32 may be engaged with any structure according to the present disclosure using connectors 32a or by any other apparatus and/or method suitable for the specific embodiment of the damper 10, including but not limited to mechanical fasteners (such as screws, bolts, etc.), chemical adhesives, interference fit, and/or combinations thereof. Generally, the piezo elements 32 may be engaged with the machinery of which the user desired to dampen vibrations.

In the view shown in FIG. 2, the cross-section of the portion of the damper 10 above the shaft 12 is rotationally offset with respect to the portion of the damper 10 below the shaft 12. A radial, cross-section view of various elements of the first illustrative embodiment of a damper 10 is shown in FIG. 5B. The cross-section of the portion of the damper 10 above the shaft 12 in FIG. 2 is along line A-A in FIG. 5B, and the portion of the damper 10 below the shaft 12 in FIG. 2 is along line B-B in FIG. 5B. This embodiment of a damper 10 may be configured as a mass damper 10, and may be specifically configured for use with radial magnetic bearings, wherein the damper 10 may be used in conjunction with a sleeve 50 (as shown in the illustrative embodiment pictured in FIG. 4 and described in detail below) that may be coupled to a shaft 12 rotatable with respect to a portion of the bearing. The damper 10 as disclosed and claimed herein is not limited to radial magnetic bearings, but embodiments thereof may be configured for use with an infinite number and type of rotary machinery, including but not limited to radial magnetic bearings and axial magnetic bearings.

As shown, the bearing rotor 20, which may be coupled to a shaft 12 having an axis of rotation 14, may be formed with one or more rotor cavities 22 along the axial length of a portion thereof. A radial, cross-sectional view of an illustrative embodiment of a bearing rotor 20 that may be used with various embodiments of the damper 10 disclosed herein is shown in FIG. 5B. Although the embodiment shown in FIG. 5B includes four rotor cavities 22 equally spaced about the inner circumferential surface of the bearing rotor 20, the scope of the present disclosure is not so limited. Accordingly, any number of rotor cavities 22 and/or spacing of rotor cavities 22 may be used without limitation.

A spacer ring 34 may be positioned adjacent either axial face of the bearing rotor 20. An electronics housing 36 may be positioned adjacent a first spacer ring 34, and a damper mass 30 may be positioned adjacent the opposite spacer ring 34. An end ring 38 may be positioned adjacent the side of the damper mass 30 opposite the spacer ring 34. One or more piezo elements 32 may extend from the electronics housing 36 through the rotor cavity 22 to the damper mass 30. A first end of the piezo element 32 may be affixed to the electronics housing 36 and a second end may be affixed to the damper mass 30. Each piezo element 32 may also be in electrical communication with an electrical circuit in the electronics housing 36, which electrical circuit is described in further detail below. All elements may be configured such that they rotate with the shaft 12 and bearing rotor 20 during use. As such, the damper 10 may be integrated into a sleeve comprising the damper 10, yet be external with respect to the bearing rotor 20 as described in further detail below for the embodiment of a damper 10 shown in FIG. 4.

To accommodate each piezo element 32, each rotor cavity 22 may correspond to a notch 16 formed in a portion of the electronics housing 36 and each spacer ring 34. The notches 16 may be configured in a manner analogous to the rotor cavities 22. Again referring to FIG. 5B, the notches 16 in the electronics housing 36 and/or either spacer ring 34 may be equally spaced about the inner circumferential surface of the electronics housing 36 and/or either spacer ring 34 as shown in FIG. 5B. However, other numbers of notches 16 may be formed in either the electronics housing 36 and/or either spacer ring 34 to accommodate a different number of piezo elements 32, and the notches 16 (regardless of the number thereof) in the electronics housing 36 and/or either spacer ring 34 may be differently positioned than those shown in FIG. 5B without limitation, including but not limited to equally spaced notches 16 and unequally spaced notches 16. Accordingly, the scope of the present disclosure is in no way limited by the number, orientation, and/or specific configuration of any rotor cavities 22, notches 16 formed in the electronics housing 36, and/or notches 16 formed in either spacer ring 34.

The natural frequency of the damper mass 30 may be preselected by manipulating the mass thereof and the number, thickness, width, electrical properties, etc. of each piezo element 32. Accordingly, as the machine rotor (not shown, but which may be engaged with the shaft 12 such that it rotates therewith), bearing rotor 20, and/or shaft 12 vibrates, the damper mass 30 may move with respect to the shaft 12. In the embodiments pictured in FIGS. 2, 3, and 4, the resultant movement of the damper mass 30 may be in a dimension that is substantially parallel to the rotational axis of the shaft 12. However, in other embodiments, such as that shown in FIG. 7, the resultant movement of the damper mass 30 may be primarily in a direction and/or directions that are not parallel to the rotational axis of the shaft 12. Accordingly, the scope of the present disclosure is in no way limited by the direction and/or magnitude of motion of the damper mass 30 that results from any vibration of the rotary machine.

In embodiments of the damper 10 configured such that resultant movement of the damper mass 30 is substantially parallel to the rotational axis of the shaft 12, this movement may in turn cause the piezo elements 32 to stretch/retract, thereby generating electricity and damping the vibration of the rotary machine as the piezo elements 32 operate in pure (or nearly pure) extension mode (as opposed to more conventional, bending-mode generators and/or piezo elements 32 that may be used in other embodiments of the damper 10).

The electricity from the piezo elements 32 may be shunted into a tuned passive electrical circuit positioned in the electronics housing 36. In general, the tuned frequency of the shunt electric circuit may be the same as the tuned frequency of the damper 10. The optimal configuration of the electrical circuit will vary from one embodiment of the damper 10 to the next, and is therefore in no way limiting to the scope of the present disclosure. In one illustrative embodiment, the tuned passive electrical circuit is comprised of various electrical components including but not limited to elements of resistance, capacitance, and inductance. In another illustrative embodiment, the tuned electrical circuit is comprised of resistance, capacitance, and semi-active elements such as operational amplifiers. Accordingly, the specific configuration of the tuned electrical circuit of the damper 10 in no way limits the scope of the present disclosure, and the optimal configuration thereof will vary from one application of the damper 10 to the next.

The end ring 38 may serve to limit the distance that the damper mass 30 may travel in the axial dimension, which consequently may serve to limit the strain on the piezo element 32 in that same dimension. Limiting the strain on the piezo element 32 may prevent fatigue and premature failure thereof. The small axial amplitude of motion of the damper mass 30 at resonance increases the appeal of the illustrative embodiments of a damper 10 shown in FIGS. 2-4 for certain applications, as a sleeve 50 (if used) may be stationary with respect to the machine rotor (since both the sleeve 50 and the shaft 12 may be rotating at the same speed and in the same direction as the machine rotor). The amplitude of this motion may be controlled at least by manipulating the size and composition of the tuned damper mass 30 and piezo element(s) 32.

Generally speaking, the damper 10 as disclosed herein may be configured to generate an electrical resonance frequency and/or frequencies that correspond to a mechanical resonance frequency and/or frequencies present in a rotary machine. The various electrical components (which may include but are not limited to resistors, capacitors, inductors, transistors, and semi-active elements) in the tuned electrical circuit may be configured to have an electrical resonance frequency the same as or similar to the mechanical resonance frequency of the rotary machine that the damper 10 is designed to dampen. The tuned electrical circuit may then dissipate an electrical charge (generated from the piezo element(s) 32) as an electrical current through the electrical circuit. The damper mass 30 may move/vibrate at various operating parameters of the rotational machine for which it is designed, which operating parameters may or may not cause resonance frequency excitations of the machine rotor or other component of the rotary machine.

The selection of the damper mass 30 magnitude and corresponding form factor may become essential for practical implementation. In one example, for a nominal 9 in. diameter sleeve 50 with a machine rotor bending mode resonant frequency of 200 Hz, and using four high performance piezo elements 32 to suspend the damper mass 30, whereby all the piezo elements 32 are mounted in parallel, approximately one-half watt of power would be dissipated with the piezo elements 32 deflecting at their rated deflection of +/−25 micrometers at the tuned damper mass 30 resonance. This is most likely a worthwhile benefit in certain applications. Such a result would require a tuned damper mass 30 of about 20 lb. This corresponds to a steel ring with a radial breadth of about 1 in and a length of about 1 in., a practical implementation. In those situations where space efficiency is of paramount importance, the damper mass 30 ring may be constructed of tungsten (which has a density more than twice that of steel). However, the specific configuration of the damper 10 and/or damper mass 30 for use therewith may have other configurations without departing from the spirit and scope of the present disclosure, and extends to all combinations of materials, shapes, masses, and/or combinations thereof.

In general, the movable damper mass 30 may be guided on its inside and outside diameters by interfacing machine parts at least for part of its axial length in order to minimize any imbalance imparted to the machine rotor as a result of axial and/or radial motion of the damper mass 30. One example of this guiding principle is shown in the illustrative embodiment of a damper 10 pictured in FIG. 4. In this embodiment, the end ring 38 may be configured with an outer radial limiter 38b and an inner radial limiter 38c. It is contemplated that the outer and inner radial limiters 38b, 38c (as well as corresponding surfaces of the damper mass 30) may be configured as a fine machined surface and/or as an inherently lubricious surface to minimize energy loss and/or heat generation in the instance of contact between the damper mass 30 and either the outer radial limiter 38b or inner radial limiter 38c. The outer radial limiter 38b may provide a radially outward limit to the motion of the damper mass 30 and the inner radial limiter 38c may provide a radially inward limit to the motion of the damper mass 30. In another embodiment, outer and inner radial limiters 38b, 38c may be formed in the bearing stator and/or a different stationary portion of the system. Because gravity may cause the damper mass 30 to fall if the rotary machine is not rotating, without inner radial limiters 38b the damper mass 30 may contact the shaft 12 (or sleeve 50, depending on the specific configuration of damper 10), which in turn may adversely affect the balance quality of the machine rotor. When the machine rotor begins to rotate, centrifugal force may then cause the damper mass 30 to locate properly with respect to the shaft 12. However, if the damper mass 30 starts to move in a radial or semi-radial dimension, an outer radial limiter 38b may mitigate fatigue and/or increase the useful life of the piezo elements 32 by preventing shearing of the piezo elements 32 adjacent any notches 16 in the electronics housing 36, either spacer ring 34, and/or rotor cavities 22. The outer radial limiter 38b may also prevent unwanted contact between the exterior circumferential surface of the damper mass 30 and other elements of the damper 10, bearing, and/or rotary machinery.

In certain embodiments, the full power-dissipation capability of the damper 10 may not be realized unless the piezo elements 32 are in full extension and retraction at the tuned frequency and at their rated deflection. Such operation may rely on an axial excitation of the damper mass 30 at the damper 10 tuned frequency. This excitation may come from various sources alone or in combination. Such sources include transferring and/or translating to the damper mass 30 motion of the machine rotor, which motion may occur in a direction not parallel to the axial dimension, and which motion may comprise machine rotor bending occurring at or near the machine rotor's natural frequency. In many applications, the natural frequency that the damper 10 is designed to dampen will be manifest in motion of the machine rotor in a direction transverse to the rotational axis of the machine rotor. Accordingly, it may be necessary for the mechanical energy at the natural resonance frequency to be transferred, translated, and/or transmitted to the damper mass 30. In the embodiment shown in FIG. 2, this may require translating the machine rotor energy to the axial dimension so as to allow extension/retraction of the piezo elements 32 in the axial dimension.

Figure 3:
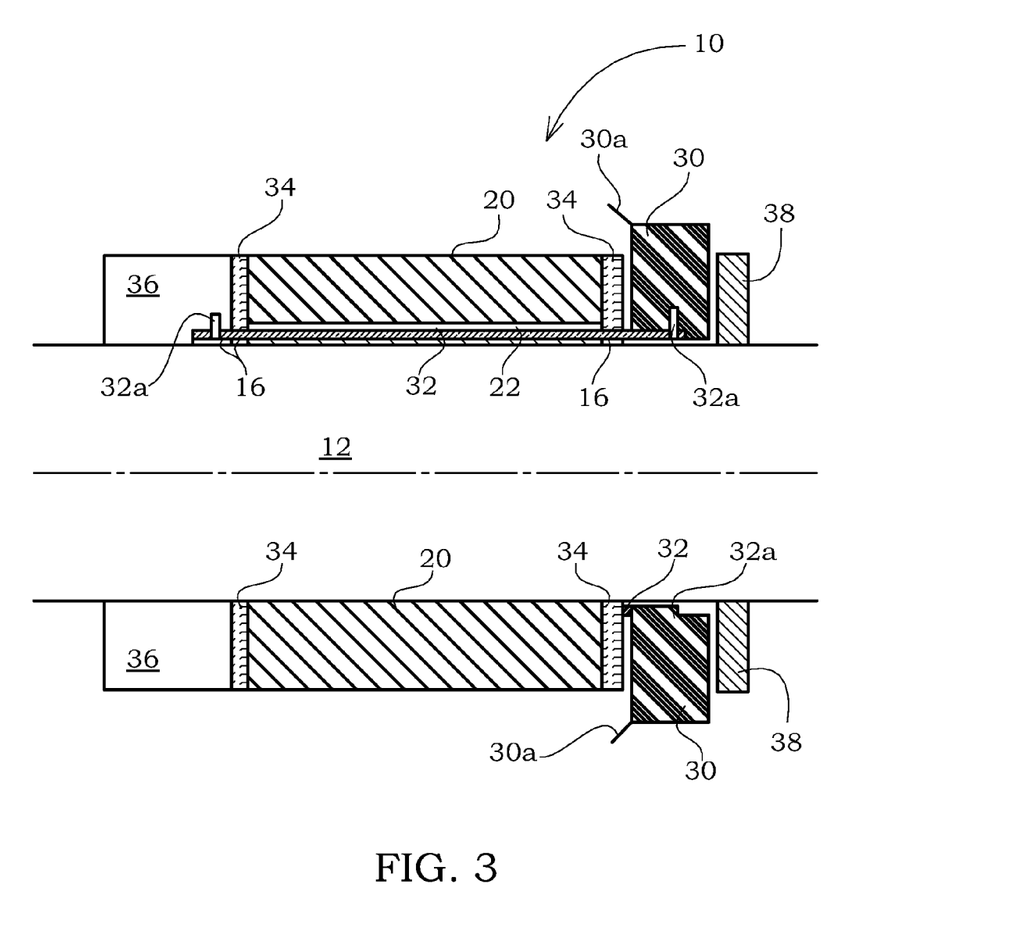
FIG. 3 provides an axial, cross-section view of a second illustrative embodiment of a damper.

Another source for the potentially required excitation of the damper mass 30 may be configuring a portion of the surface of the damper mass 30 with one or more surface features 30a thereon. In the embodiment of a damper 30 shown in FIG. 3, the surface feature 30a may be configured as an aerodynamic feature that causes energy to be imparted to the damper mass 30 when the damper mass 30 is rotating. As in FIG. 2, in FIG. 3 the cross-section of the portion of the damper 10 above the shaft 12 is along line A-A in FIG. 5B, and the portion of the damper 10 below the shaft 12 in FIG. 3 is along line B-B in FIG. 5B. Alternatively, the surface feature 30a may comprise one or more gas pockets etched into the surface of the damper mass 30, such as those used on dry gas seals. Such a surface feature 30a may be used to cause excitation of the damper 10. Because energy input may cause a device to resonate at its natural frequency, the scope of the present disclosure is in no way limited by the specific method and/or apparatus used to provide excitation to the damper 10 and/or damper mass 30, and any such method and/or apparatus may be used alone or in combination without limitation.

Using the piezo elements 32 with known ratings, one may construct a damper 10 as described above of the appropriate size for a specific application and confirm tuning for a first bending-mode frequency inherent to the machine rotor. It is contemplated that attainment of tuning frequency should be established first for pure axial motion of the damper mass 30 in a non-rotating test fixture. Following this, coupling of lateral to axial damper 10 motion may need to be demonstrated by shaking the assembly in the lateral direction. The testing may then be moved to a rotating rig, but experimentation with various non-linear spring mountings of the electronic housing 36 relative to the bearing rotor 20 may be required to achieve proper coupling (and/or translating, transmitting, etc.) of machine rotor motion to axial motion of the damper mass 30.

Figure 4:
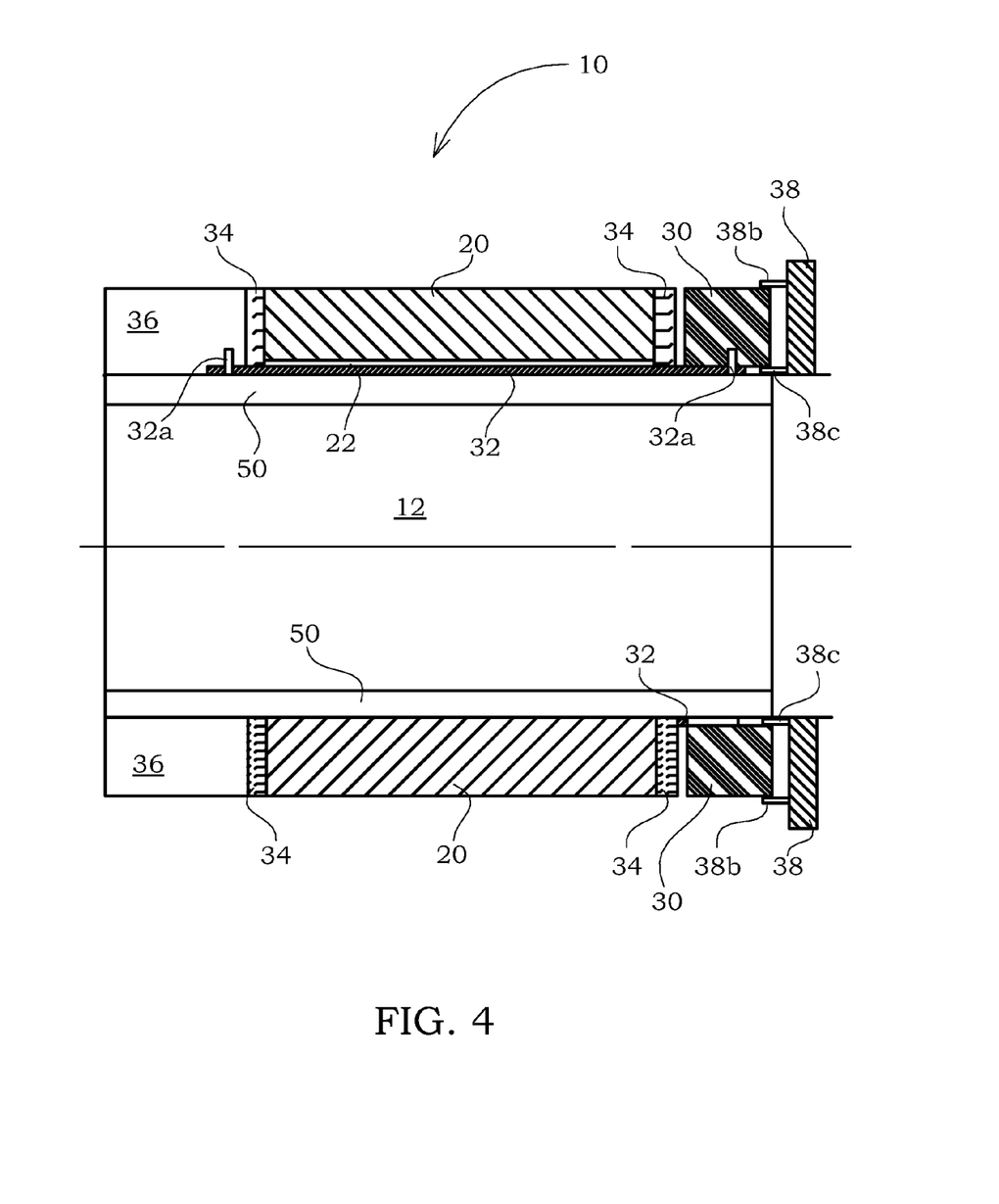
FIG. 4 provides an axial, cross-section view a third illustrative embodiment of a damper.
Figure 5A:
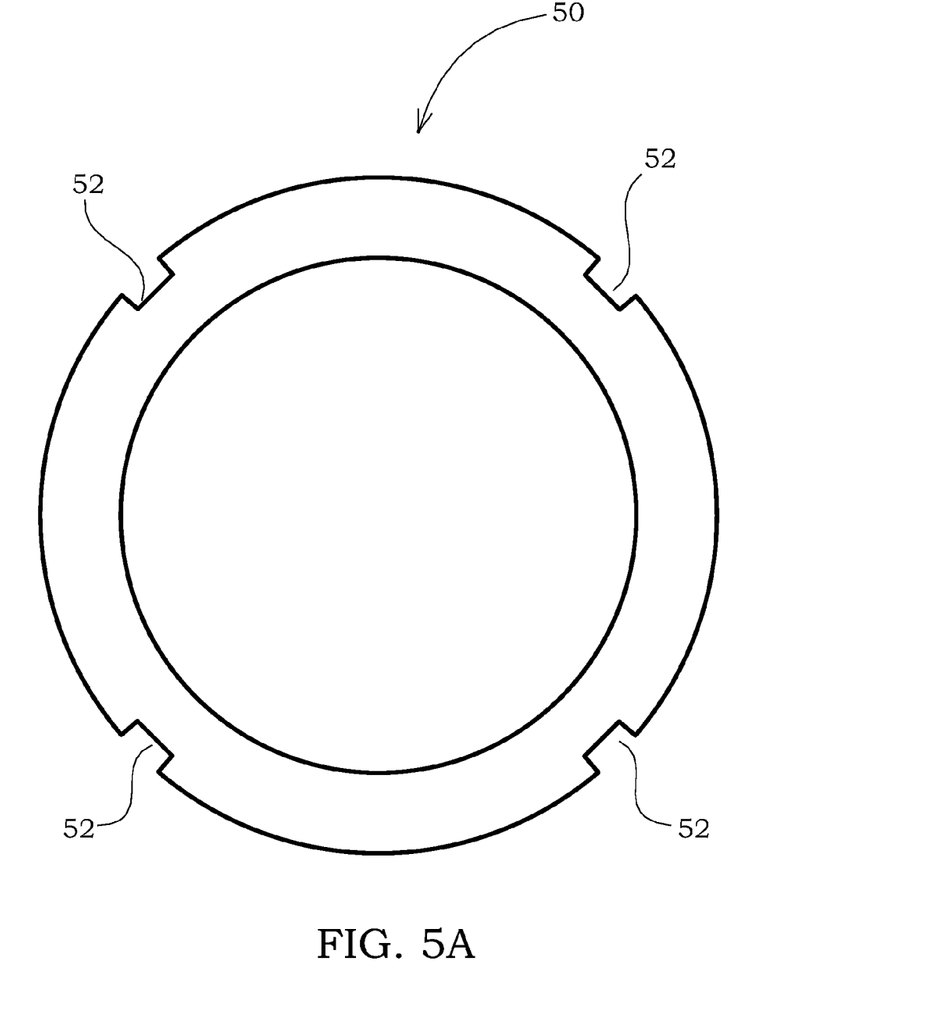
FIG. 5A provides a radial, cross-section view of a sleeve that may be used with the third illustrative embodiment shown in FIG. 4.
Figure 5B:
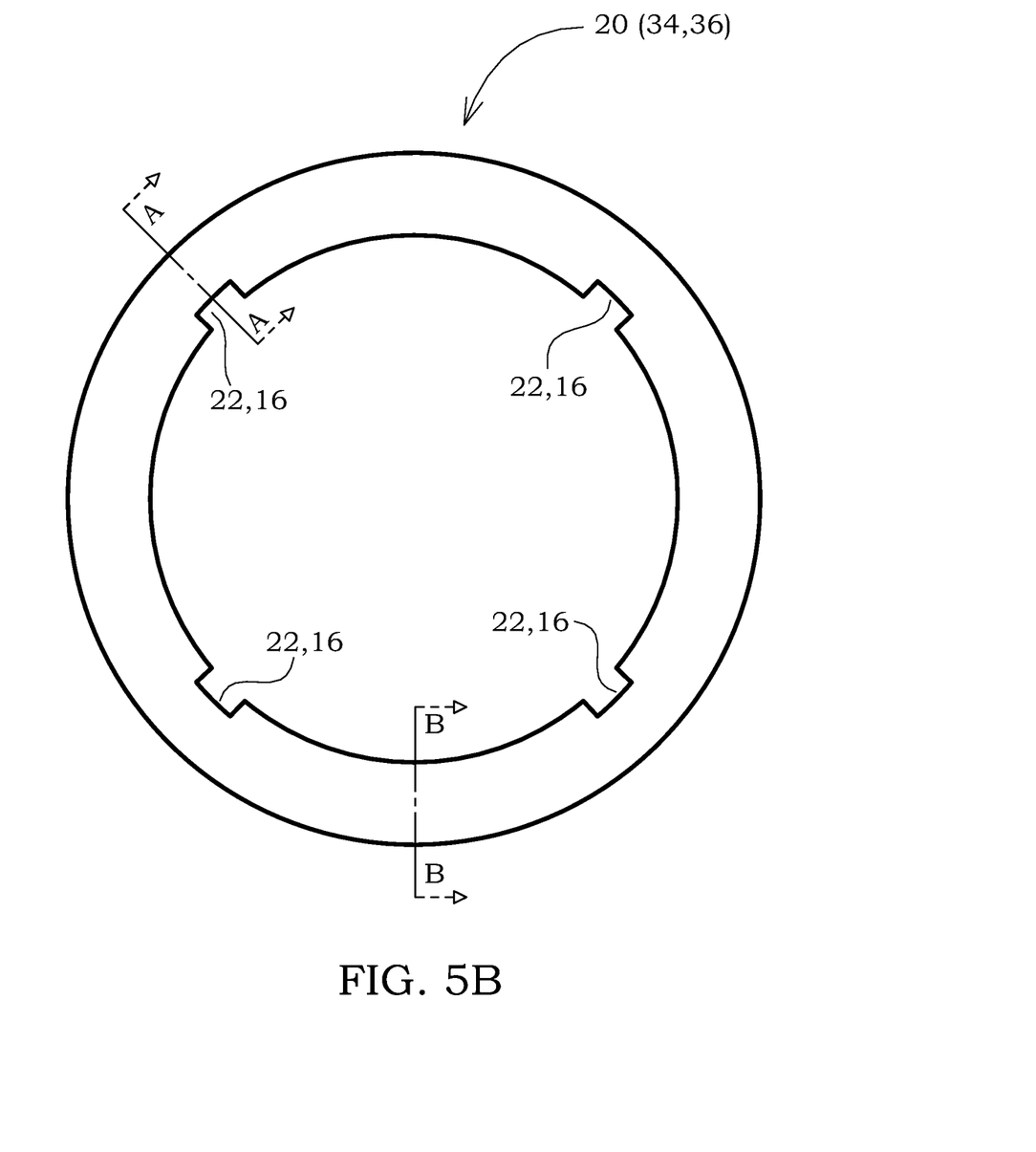
FIG. 5B provides a radial, cross-section view of various elements that may be used with the first illustrative embodiment of a damper.

In another embodiment of a damper 10, as shown in FIG. 4, a sleeve 50 may be engaged with the shaft 12 such that the sleeve 50 rotates with the shaft 12. As in FIGS. 2 & 3, in FIG. 4 the cross-section of the portion of the damper 10 above the shaft 12 is along line A-A in FIG. 5B, and the portion of the damper 10 below the shaft 12 in FIG. 4 is along line B-B in FIG. 5B. The sleeve 50 may extend at least the entire axial length of the damper 10, or it may extend to an end ring 38. The sleeve 50 may provide a generally smooth, machined surface of generally constant radius. The sleeve 50 may be configured with one or more axial channels 52 therein to accommodate one or more piezo elements 32. A radial, cross-section view of an illustrative embodiment of a sleeve 50 that may be used with various embodiments of the damper 10 is shown in FIG. 5A. As shown in FIG. 5A, the axial channels 52 may be configured in a manner analogous to the rotor cavities 22, and the axial channels 52 may be equally spaced about the outer circumferential surface of the sleeve 50. However, other numbers of axial channels 52 may be formed in the sleeve 50 to accommodate a different number of piezo elements 32, and the axial channels 52 (regardless of the number thereof) in the sleeve 50 may be differently positioned than those shown in FIG. 5A without limitation, including but not limited to equally spaced axial channels 52 and unequally spaced axial channels 52. Accordingly, the scope of the present disclosure is in no way limited by the number, orientation, and/or specific configuration of any axial channels 52 formed in the sleeve 50 (if present for that specific embodiment of a damper 10).

Although some embodiments of the damper 10 may be optimally employed on a rotary machine using a sleeve 50, other embodiments of the damper 10 may be optimally employed by directly engaging the damper 10 with the shaft 12 of the rotary machine. Accordingly, the scope of the present disclosure is not limited by the presence or absence of a sleeve 50. Furthermore, the various elements of the damper 10 may be engaged with the shaft 12 and/or a sleeve 50, and/or a sleeve 50 may be engaged with a shaft 12 via any suitable method and/or apparatus, including but not limited to mechanical fasteners (e.g., set screws, bolts, collars), chemical adhesives, welding, interference fit, and/or combinations thereof without limitation.

Figure 8:
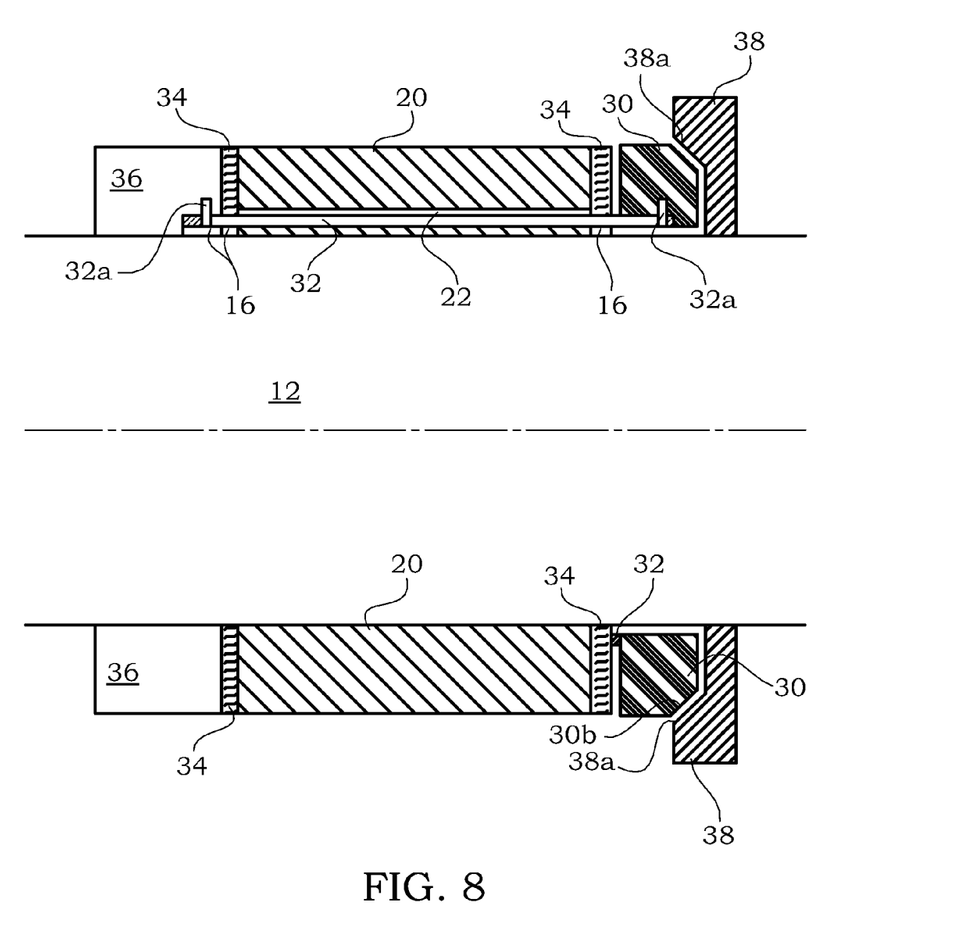
FIG. 8 provides an axial, cross-section view of a fifth illustrative embodiment of a damper.

In another embodiment of a damper 10 shown in axial cross section in FIG. 8, the damper mass 30 may be formed with a chamfer 30b on the outside diameter of the side facing the end ring 38. As with FIGS. 2-4, in FIG. 8 the cross-section of the portion of the damper 10 above the shaft 12 is along line A-A in FIG. 5B, and the portion of the damper 10 below the shaft 12 in FIG. 8 is along line B-B in FIG. 5B The chamfer 30b may correspond to an angled extension 38a formed in the end ring 38, such that the angled extension 38a of the end ring 38 is angled toward the damper mass 30. Accordingly, if the shaft 12 (and consequently the rotor 20 and damper mass 30) moves laterally, transversely, and/or radially, at least a portion of that movement may be translated to axial movement of the damper mass 30 through the engagement between the damper mass 30 and the end ring 38 via the interaction between the chamfer 30b and the angled extension 38a. The portion of the damper mass 30 movement that is translated to the axial dimension will depend at least upon the angles of the chamfer 30b and/or angled extension 38a. In such an embodiment, the angled extension 38a may be configured to serve as an outer radial limiter 38b, as previously described in detail above.

In an alternative embodiment not pictured herein, a piezo element 32 may be positioned between the machine rotor and the bearing rotor 20. In this embodiment the bearing rotor 20 may be configured with a tuned, shunted electrical circuit in electrical communication with the piezo element 32, which electrical circuit may include but is not limited to passive circuit elements of resistance, capacitance and/or inductance, and/or semi-active elements such as operational amplifiers. Additionally, in this embodiment, the end of the piezo element(s) 32 opposite the damper mass 30 may be mechanically engaged with the bearing rotor 20, a sleeve 50 (if present for that embodiment of a damper 10), and/or the shaft 12. However, that end of the piezo element(s) 32 may also be mechanically engaged with an electronics housing 36 if present for that embodiment of a damper 10.

Figure 6:
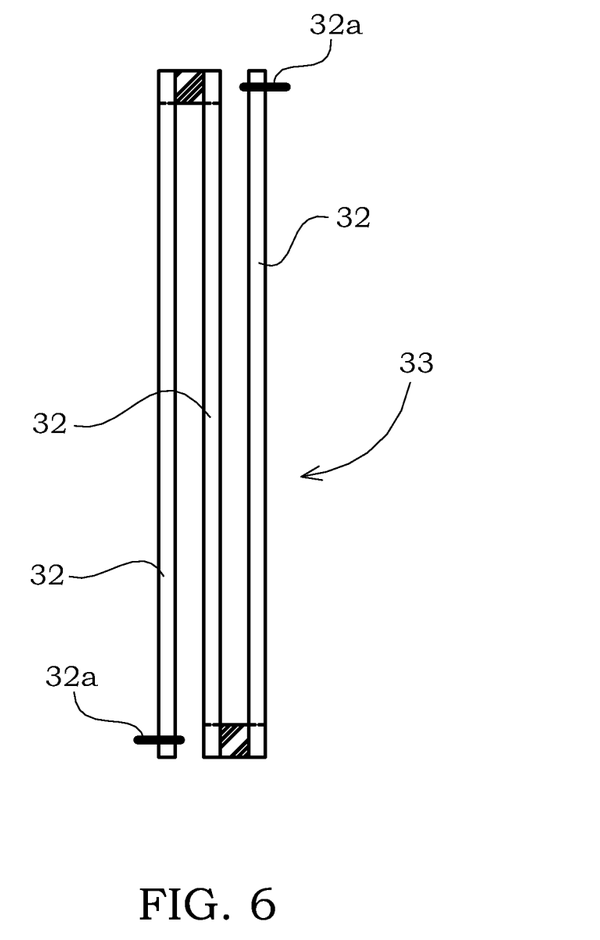
FIG. 6 provides a side view of an arrangement of piezo elements that may be used with various embodiments of the damper.

In another embodiment, piezo elements 32 may be ganged together, end to end, in a compressed Z-shaped (or stacked) configuration to form a peizo element assembly 33, as shown in FIG. 6. In this embodiment of a piezo element assembly 33, an odd number of piezo elements 32 (e.g., three) may be affixed to one another in an end-to-end fashion along their lengths such that the piezo elements 32 are not able to pivot with respect to one another. One free end of the piezo element assembly 33 may be in electrical communication with the tuned electric circuit and mechanically engaged with either the electronics housing 36, bearing rotor 20, sleeve 50, and/or shaft 12 via a connector 32a that may be positioned adjacent the terminal end of the piezo element 32 adjacent that free end of the piezo element assembly 33. The other free end of the piezo element assembly 33 may be engaged with the damper mass 30, such that the total axial length of three piezo elements 32 (or the number of piezo elements 32 present in that specific embodiment of a piezo element assembly 33) is approximately equal to that of only one piezo element 32. Such an embodiment may allow for increased electrical charge generation for a given amount of axial movement of the damper mass 30 than in embodiments of a damper 10 without stacked piezo elements 32.

Figure 7A:
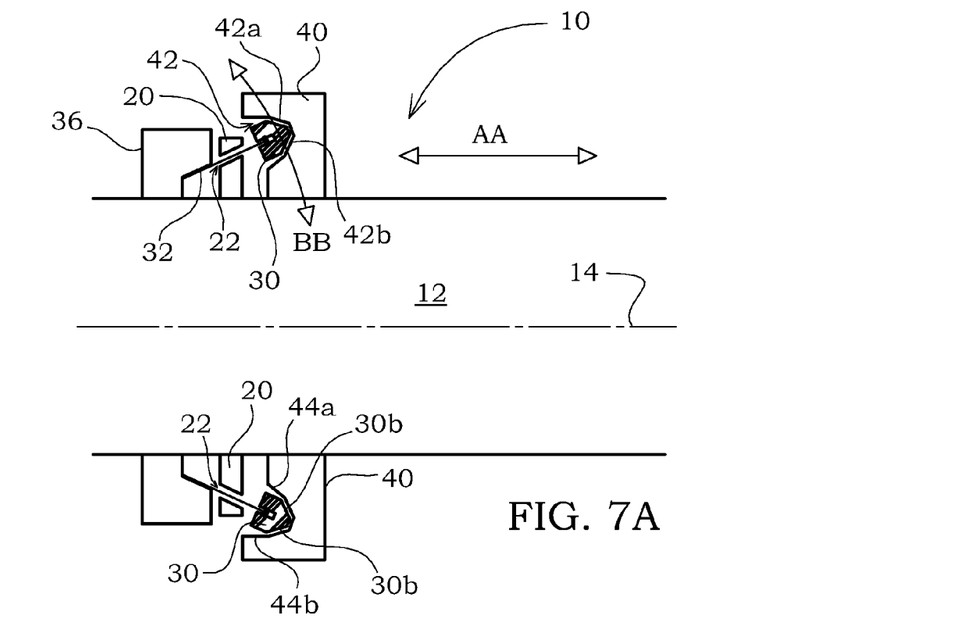
FIG. 7A provides an axial, cross-section view a fourth illustrative embodiment of a damper.
Figure 7B:
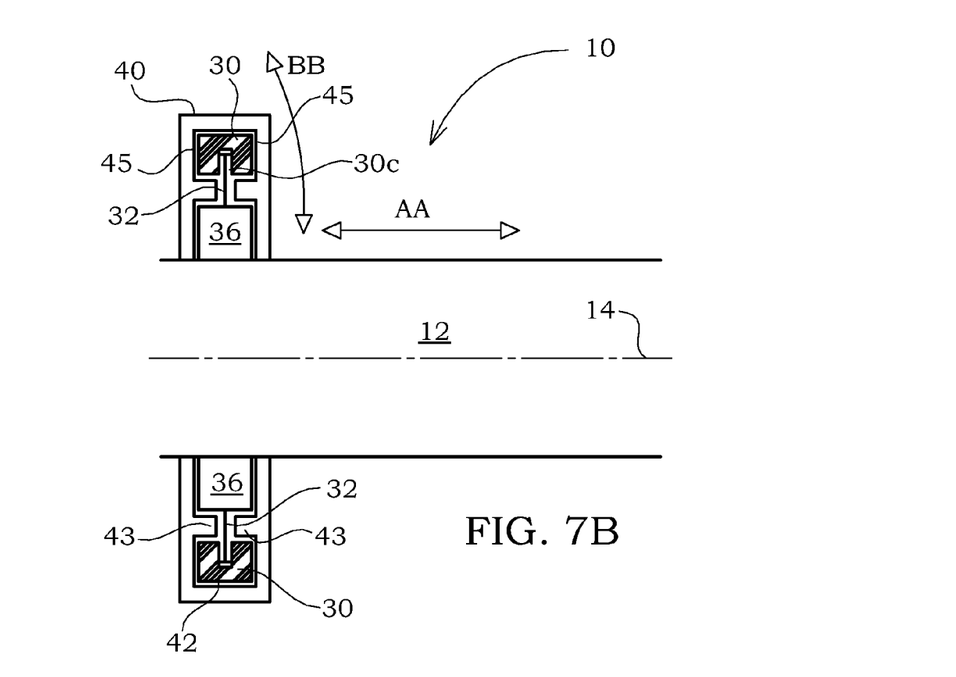
FIG. 7B provides an axial, cross-section view of another illustrative embodiment of a damper.

In another embodiment, such as those pictured in FIGS. 7A & 7B, rather than using extension-type piezo elements 32, bending-mode piezo elements 32 may be employed. In such embodiments, the damper mass 30 may be designed to resonate in a motion in a transverse plane with respect to the shaft 12 (as shown for the embodiment in FIG. 7B), or in a plane that is not parallel to the rotational axis of the shaft 12 (as shown for the embodiment in FIG. 7A). A bending force on the piezo elements 32 may be generally applied in a direction along line B-B in FIGS. 7A & 7B, whereas extension/retraction forces for the embodiments of a damper 10 shown in FIGS. 2-4 may be generally applied in a direction along line A-A in FIGS. 7A & 7B. However, in most practical applications it is contemplated that the forces on any piezo element 32 may not be so discrete, and instead may compromise a plurality of forces of varying magnitudes and directions. in such an arrangement, the damper mass 30 may be effectively engaged with the electronics housing 36 in a cantilevered manner, which engagement may be accomplished using the piezo elements 32. However, bending-mode piezo elements 32 may be employed in an embodiment configured similarly to those shown in FIGS. 2-4 and 8 (in which the piezo elements 32 are arranged in a generally parallel with respect to the rotational axis of the shaft 12) without limitation. Bending-mode piezo elements 32 may be accommodated in such an embodiment by increasing the radial dimension of the notches 16, axial channels 52, and/or rotor cavities 22, and/or by increasing the clearance between the piezo elements 32 and the shaft 12 (or sleeve 50 if present for that embodiment of a damper 10) to allow for the change in shape of the piezo elements 32 upon bending. Accordingly, the scope of the present disclosure is not limited by the type of piezo elements 32 and/or piezo element assembly 33 used and/or the configuration, orientation, and/or dimensions thereof.

Referring now specifically to FIG. 7A, which provides an axial, cross-section view of another illustrative embodiment of a damper 10, the piezo elements 32 may be angled with respect to the rotational axis of the shaft 12. Accordingly, rotor cavities 22 formed in the bearing rotor 20 and/or axial channels 52 formed in the sleeve 50 to accommodate the piezo elements 32 may be angled with respect to the rotational axis of the shaft 12 by an amount similar or equal to that of the piezo elements 32. Additionally, the rotor cavities 22 may be formed as channels having a generally rectangular cross-sectional shape to accommodate piezo elements 32 having a similar cross sectional shape. However, other embodiments may have different cross-sectional shapes of rotor cavities 22 and/or piezo elements 32 without limitation.

As in other embodiments of the damper 10 disclosed herein, a first end of the piezo elements 32 may be in electrical communication with a tuned electrical circuit (which may be positioned in an electronics housing 36) and mechanically engaged with an electronics housing 36, bearing rotor 20, shaft 12, and/or sleeve 50. The opposite end of the piezo elements 32 may be engaged with a damper mass 30, which may be substantially ring-shaped. The damper mass 30 may be formed with one or more slots 30c therein to facilitate engagement between the damper mass 30 and the piezo elements 32. Spacer rings 34 may also be used (although not shown in FIG. 7A), and notches 16 to accommodate the piezo elements 32 may be formed in the electronics housing 36 and/or spacer rings 34 as needed and as previously described for other embodiments of the damper 10.

An end ring 38 may be engaged with the shaft 12 (or sleeve 50) such that it rotates therewith. The end ring 38 in FIG. 7A may be configured as a mass guide 40 to provide various limits to the movement of the damper mass 30 and/or to translate certain movements of the damper mass 30 into bending, extension, and/or retraction of the piezo elements 32. The mass guide 40 may be configured with a channel 42 therein into which all or a portion of the damper mass 30 may be positioned. The channel 42 may include an upper angled surface 42a and a lower angled surface 42b. The upper angled surface 42a may lead to an upper limit 44a, the surface of which may be substantially parallel with respect to the axis of rotation of the shaft. The lower angled surface 42b may lead to a lower limit 44b which may also be substantially parallel with respect to the axis of rotation of the shaft 12. Although not shown in FIG. 7A, a lip 43 may extend downward from the upper limit 44a.

When the damper mass 30 is positioned within the channel 42 of the mass guide 40, as shown in FIG. 7A, the upper angled surface 42a (in cooperation with a chamfer 30b formed in the damper mass 30 that may correspond to the upper angled surface 42a) may cause radially outward damper mass 30 motion to exert a bending (or retraction/extension) force on the piezo elements 32, and the upper limit 44a may provide a limit to the radially outward movement of the damper mass 30. The lower angled surface 42b (in cooperation with a second chamfer 30b formed in the damper mass 30 that may correspond to the lower angled surface 42b) may cause radially inward damper mass 30 motion to exert a bending (or retraction/extension) force on the piezo elements 32, and the lower limit 44b may provide a limit to the radially inward movement of the damper mass 30. A lip 43 (if present) may provide a limit to the axially inward movement of the damper mass 30, and an axial interface 45 positioned between the upper and lower angled surfaces 42a, 42b may provide a limit to the axially outward movement of the damper mass 30. The embodiment of a mass guide 40 shown in FIG. 7A is one of an infinite number of ways one may configure a damper 10 according to the present disclosure such that radial movement, axial movement, and/or combinations of radial and axial movement of the damper mass 30 causes bending, retraction, and/or extension of the piezo elements 32. Accordingly, the scope of the present disclosure is not limited by the specific configuration of the piezo elements 32, end ring 38, and/or mass guide 40, but extends to any configuration in which radial damper mass 30 movement causes bending (and/or extension/retraction as described above for other embodiments of the damper 10) of the piezo elements 32.

Referring now specifically to FIG. 7B, which provides an axial, cross-section view of another illustrative embodiment of a damper 10, the piezo elements 32 may be generally transverse with respect to the rotational axis of the shaft 12. As in other embodiments of the damper 10 disclosed herein, a first end of the piezo elements 32 may be in electrical communication with a tuned electrical circuit (which may be positioned in an electronics housing 36) and mechanically engaged with an electronics housing 36, bearing rotor 20, shaft 12, and/or sleeve 50. The opposite end of the piezo elements 32 may be engaged with a damper mass 30, which may be substantially ring-shaped. The damper mass 30 may be formed with one or more slots 30c therein to facilitate engagement between the damper mass 30 and the piezo elements 32. Spacer rings 34 may also be used (though not shown in FIG. 7A), and notches 16 to accommodate the piezo elements 32 may be formed in the electronics housing 36 and/or spacer rings 34 as needed and as previously described for other embodiments of the damper 10.

An end ring 38 may be engaged with the shaft 12 (or sleeve 50) such that it rotates therewith. The end ring 38 in FIG. 7B may be configured as a mass guide 40 to provide various limits to the movement of the damper mass 30. The mass guide 40 may be configured with a channel 42 therein into which all or a portion of the damper mass 30 may be positioned. The channel 42 may be bound on a radially inward surface via one or more axially extending lips 43. Inner axial surfaces of the channel 42 may provide axial interfaces 45 for the damper mass 30 to limit the axial movement of the damper mass 30. An upper surface one or more lips 43 may provide a limit to the radially inward movement of the damper mass 30.

A top interior surface of the channel 42 may provide a limit to the radially outward movement of the damper mass 30.

In the embodiment shown in FIG. 7B, radially inward damper mass 30 motion may exert a bending (and/or retraction) force on the piezo elements 32. Radially outward damper mass 30 motion may exert a bending (and/or extension) force on the piezo elements 32. The embodiment of a mass guide 40 shown in FIG. 7B is one of an infinite number of ways one may configure a damper 10 according to the present disclosure such that radial movement, axial movement, and/or combinations of radial and axial movement of the damper mass 30 causes bending, retraction, and/or extension of the piezo elements 32. Accordingly, the scope of the present disclosure is not limited by the specific configuration of the piezo elements 32, end ring 38, and/or mass guide 40, but extends to any configuration in which radial damper mass 30 movement causes bending (and/or extension/retraction as described above for other embodiments of the damper 10) of the piezo elements 32.

In a corollary manner to the embodiment shown in FIG. 7A, portions of the channel 42 for the embodiment of a mass guide 40 shown in FIG. 7B may be angled such that those angled portions correspond to chamfers 30b formed in the damper mass 30. Proper configuration of those angled portions of the channel 42 and cooperating chamfers 30b may result in the piezo elements 32 experiencing more bending, retraction, and/or extension based on a given amount of damper mass 30 motion than without such angled portions of the channel 42 and cooperating chamfers 30b in the damper mass 30.

In any embodiment of a damper 10 wherein a portion of the damper 10 (e.g., end ring 38, mass guide 40, etc.), bearing, and/or rotary machine is configured to engage a portion of the damper mass 30, that portion of the damper 10, bearing, rotary machine, and/or damper mass 30 may be configured as a fine machined surface and/or as an inherently lubricious surface to minimize energy loss and/or heat generation in the instance of contact between the damper mass 30 and that portion of the damper 10, bearing, and/or rotary machine.

In another alternative embodiment not pictured herein, the piezo element 32 may be positioned in an auxiliary bearing stator, such that the piezo element 32 is oriented transversely in the rotor plane. Such an embodiment may be generally similar to that shown in FIG. 7A, as those of ordinary skill in the art will appreciate in light of the present disclosure.

Depending on the specific configuration of the damper 10, bending-type or extension-type piezo elements 32 may be used without limitation, as previously described for various embodiments of the damper 10. The specific type of piezo element 32 used for a specific embodiment of the damper 10 may depend at least upon the amount of deflection in the rotary machinery and mounting configuration of the damper 10. Accordingly, the scope of the present disclosure is not limited in any way by the selection of piezo elements 32 and/or the orientation thereof with respect to other elements of the damper 10 and/or the rotary machine.

The benefit of piezoelectric damping in any of these designs may be quantified by expressing the power loss in terms of the equivalent viscous damping coefficient, $c_{eq}$. This result can then be used directly in rotordynamic analyses to quantity the advantage gained for a particular rotor. This equivalency is given by $$c_{eq} = \frac{W_d}{\pi \omega X^2}$$

where $W_d$=energy dissipated per cycle, $\omega$=circular frequency of vibration, and X is the single amplitude of vibration. These parameters may be established for any given application using the piezoelectric supplier's data.

The optimal number, configuration, dimensions, geometries, shapes, and/or relative locations of the rotor cavities 22, damper masses 30, piezo elements 32, piezo element assemblies 33, spacer rings 34, electronics housings 36, end rings 38, mass guides 40, and/or sleeves 50 will vary from one embodiment of the damper 10 to the next, as will the optimal configuration thereof. Accordingly, the damper 10 as disclosed and claimed herein is in no way limited by the specific constraints, dimensions, and/or configuration of those elements.

The damper 10 as disclosed and claimed herein may extend to any rotary machinery that may experience vibration, and is in no way limited to magnetic bearings. The optimal number, dimensions, geometries, relative placement, shapes, and/or configuration of rotor cavities 22, damper masses 30, piezo elements 32, piezo element assemblies 33, spacer rings 34, electronics housings 36, notches 16, end rings 38, mass guides 40, and/or sleeves 50 will vary from one embodiment of the damper 10 to the next, and are therefore in no way limiting to the scope thereof. The various elements of an apparatus using at least one feature of the present disclosure may be formed of any material that is suitable for the application for which the apparatus is used. Such materials include but are not limited to metals and their metal alloys, polymeric materials, and/or combinations thereof.

Although the specific embodiments pictured and described herein pertain to dampers 10 having an equal number of piezo elements 32 and corresponding rotor cavities 22, notches 16, and/or axial channels 52, the damper 10 may be configured with other orientations and/or with different quantities of the various elements having different shapes and/or orientations, equally or unequally spaced from other elements of the damper 10. Accordingly, the scope of the present disclosure is in no way limited by the specific shape, configuration, and/or dimensions of the above elements, and/or the relative quantities and/or positions thereof.

Having described the preferred embodiments, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure as disclosed and claimed herein. Furthermore, variations and modifications of the foregoing are within the scope of the damper 10. It is understood that the scope of the damper 10 as disclosed herein extends to all alternative combinations of one or more of the individual features mentioned or evident from the text and/or drawings. All of these different combinations constitute various alternative aspects of the damper 10. The embodiments described herein explain the best modes known for practicing the damper 10 and will enable others skilled in the art to utilize the same. The claims are to be construed to include alternative embodiments to the extent permitted by the prior art.

It should be noted that the present disclosure is not limited to the specific embodiments pictured and described herein, but are intended to apply to all similar apparatuses for reducing vibrations in a rotary machine. Modifications and alterations from the described embodiments will occur to those skilled in the art without departure from the spirit and scope of the present disclosure.

The invention claimed is:

1. A damper comprising:
   a. an electrical component;
   b. a piezo element having first and second ends, wherein said first end of said piezo element is engaged with said electrical component, and wherein said piezo element is in electrical communication with said electrical component; and
   c. a damper mass engaged with said second end of said piezo element, wherein said damper mass, said piezo element, and said electrical component are configured to have an electrical resonance frequency that corresponds to a mechanical resonance frequency of a component of a rotary machine.

2. The damper according to claim 1 further comprising an electronics housing, wherein said electrical component is further defined as being positioned in said electronics housing.

3. The damper according to claim 2 wherein said electronics housing, said piezo element, and said damper mass are further defined as being configured to rotate with a machine rotor of said rotary machine.

4. The damper according to claim 1 wherein said electrical component is further defined as being positioned in a bearing rotor.

5. The damper according to claim 3 further comprising a sleeve, wherein said sleeve is configured to rotate with a machine rotor of said rotary machine.

6. The damper according to claim 5 further comprising a second piezo element having first and second ends, wherein said first end of said second piezo element is engaged with said electrical component, wherein said second end of said second piezo element is engaged with said damper mass, and wherein said second piezo element is in electrical communication with said electrical component.

7. The damper according to claim 6 further comprising an end ring adjacent said damper mass.

8. The damper according to claim 7 wherein said electrical component is further defined as being selected from a group consisting of a resistor, a capacitor, an inductor, and a semi-active element.

9. The damper according to claim 7 further comprising a plurality of electrical components.

10. A damper comprising:
    a. an electronics housing configured for engagement with a machine rotor of a rotary machine, wherein an electrical component is positioned within said electronics housing;
    b. a piezo element having first and second ends, wherein said first end of said piezo element is engaged with said electronics housing, and wherein said piezo element is in electrical communication with said electrical component;
    c. a damper mass engaged with said second end of said piezo element, wherein said damper mass, said piezo element, and said electrical component are configured to have an electrical resonance frequency that corresponds to a mechanical resonance frequency of a component of a rotary machine; and,
    d. an end ring configured for engagement with said machine rotor, wherein said end ring is positioned adjacent said damper mass and provides at least an axial limit to the maximum distance the damper mass may be located away from said electronics housing.

11. The damper according to claim 10 wherein said end ring further comprises an outer radial limiter positioned radially outward with respect to said damper mass and an inner radial limiter positioned radially inward with respect to said damper mass.

12. The damper according to claim 10 wherein said end ring further comprises an angled extension on a surface thereof adjacent said damper mass and said damper mass further comprises a chamfer 30b corresponding to said angled extension.

13. The damper according to claim 10 wherein said damper mass further comprises a surface feature.

14. The damper according to claim 10 further comprising a plurality of piezo elements, wherein each said piezo element has a first and a second end, wherein said first end of each said piezo element is engaged with said electrical component, wherein said second end of each said piezo element is engaged with said damper mass, and wherein each said piezo element is in electrical communication with said electrical component.

15. The damper according to claim 14 wherein said plurality of piezo elements is further defined as a piezo element assembly.

16. The damper according to claim 14 wherein said damper mass is further defined as being moveable with respect to said electronics housing in a dimension that is generally parallel with respect to a rotational axis of said machine rotor.

17. The damper according to claim 14 wherein said end ring is further defined as a mass guide, wherein said mass guide is configured to translate movement of said damper mass that occurs in a plane that is not parallel to a rotational axis of said machine rotor to a bending force on said plurality of piezo elements.

18. The damper according to claim 14 wherein said end ring is further defined as a mass guide, wherein said mass guide is configured to translate movement of said damper mass that occurs in a plane that is not parallel to a rotational axis of said machine rotor to a force on said plurality of piezo elements that is generally parallel to a length of each said piezo element.

19. A method of damping a vibration in a rotary machine, said method comprising:
    a. engaging a damper with a shaft of said rotary machine, wherein said shaft is rotatable with respect to a second structure of said rotary machine, wherein said damper comprises:
       i. an electrical component engaged with said rotary machine;
       ii. a piezo element engaged with said rotary machine, wherein said piezo element is in electrical communication with said electrical component; and,
       iii. a damper mass engaged with said piezo element at a second end of said piezo element;
    b. tuning electrical component, said piezo element, and said damper mass to an electrical resonance frequency that corresponds to a mechanical resonance frequency of a machine rotor of said rotary machine, wherein said machine rotor is engaged with said shaft;
    c. allowing said damper mass to move with respect to said electronics housing;
    d. generating an electrical charge via said piezo element when said damper mass moves; and,
    e. dissipating said electrical charge as an electrical current via electrical component.

* * * * *